Sept. 22, 1925.

E. P. JONES

AUTOMOBILE SIGNAL

Filed Oct. 29, 1923

Inventor

Edward P. Jones.

By A. J. O'Brien

Attorney

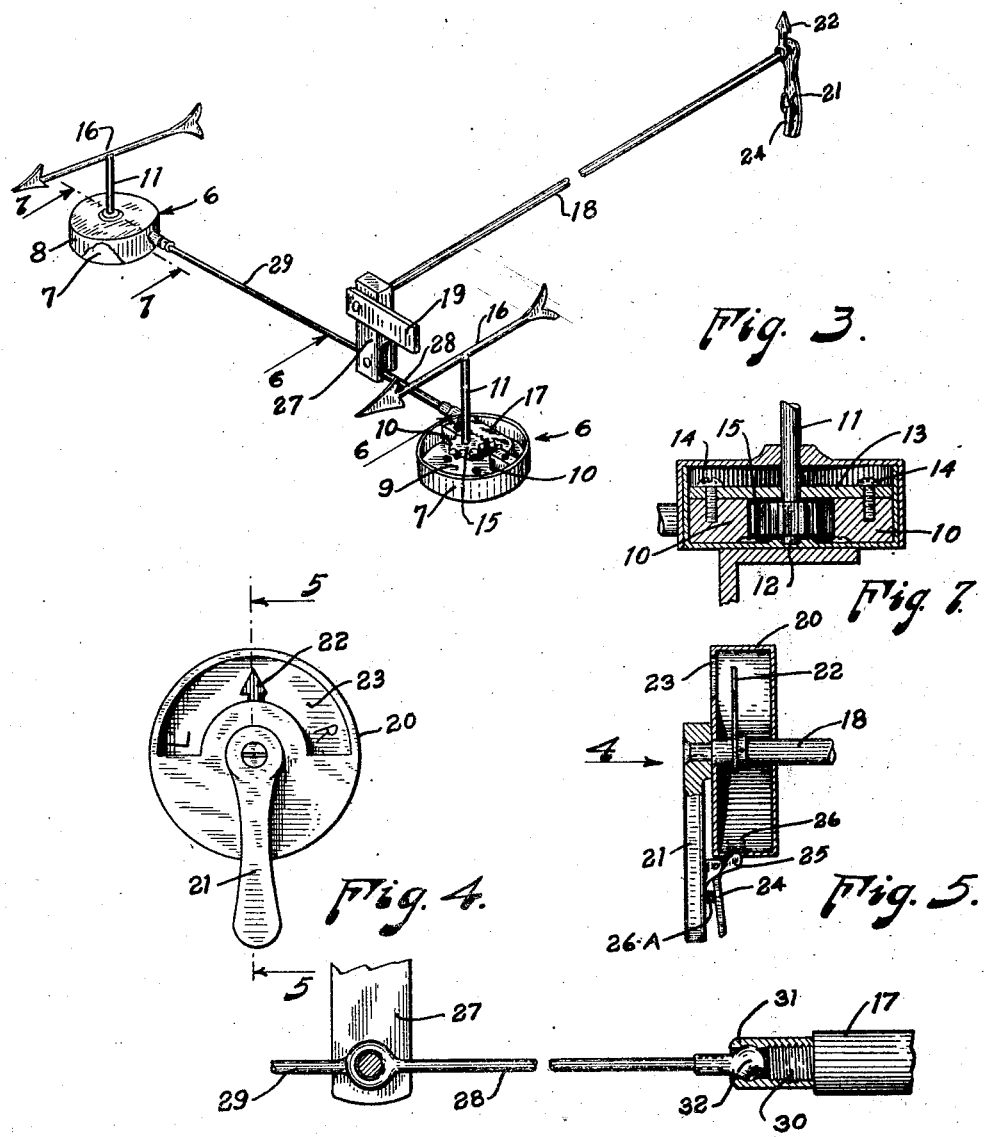

Patented Sept. 22, 1925.

1,554,506

UNITED STATES PATENT OFFICE.

EDWARD P. JONES, OF BRECKENRIDGE, COLORADO.

AUTOMOBILE SIGNAL.

Application filed October 29, 1923. Serial No. 671,351.

*To all whom it may concern:*

Be it known that I, EDWARD P. JONES, a citizen of the United States, residing at Breckenridge, county of Summit, and State of Colorado, have invented certain new and useful Improvements in Automobile Signals; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to signals for automobiles and has for its object the production of a signal, by means of which the driver of a vehicle can indicate his intention to turn to the right or to the left.

Owing to the density of the automobile traffic on our streets and roads, it is imperative that the driver shall employ some means for signaling that will apprise other drivers, as well as pedestrians, of his intention to turn. The need of such a signal is so apparent that I shall not further dwell thereupon, but proceed to the description of the signal invented by me, and which forms the subject matter of the present invention.

My improved signal, briefly described, consists of a pair of pivotally mounted arrows, one of which is mounted on each side of the radiator. Means are provided for simultaneously turning the arrows about their axes and for maintaining them in a direction pointing directly ahead or inclined to either side. The operating mechanism is so designed and located that it is readily accessible to the driver and may have a handle portion located on the dashboard or on the steering post. By merely turning a lever the driver can rotate the arrows and point them in the direction which he intends to go and thereby inform pedestrians and drivers of his intentions.

In order better and more clearly to describe my invention, I shall have reference to the accompanying drawing in which the preferred form of my invention is shown, and in which:

Fig. 3 is a perspective view showing the signal detached from the automobile, the parts being shown in operative relation;

Fig. 4 is a view taken in the direction of arrow 4, Fig. 5, and shows the indicator and handle which are located on the instrument board or at some point accessible to the driver;

Fig. 5 is a section taken on line 5—5, Fig. 4;

Fig. 6 is a view, partly in section, taken on line 6—6, Fig. 3; and

Fig. 7 is a section taken on line 7—7, Fig. 3.

The same reference characters will be used to designate the same parts throughout the several views.

Numeral 1 designates the radiator and 2 the headlights of an automobile, while 3 designates the front fenders.

Secured to the inclined sides 4 of the fenders are brackets 5 which serve as supports for the signal assembly, indicated as a whole by numeral 6, and which I will now describe.

Figure 1:
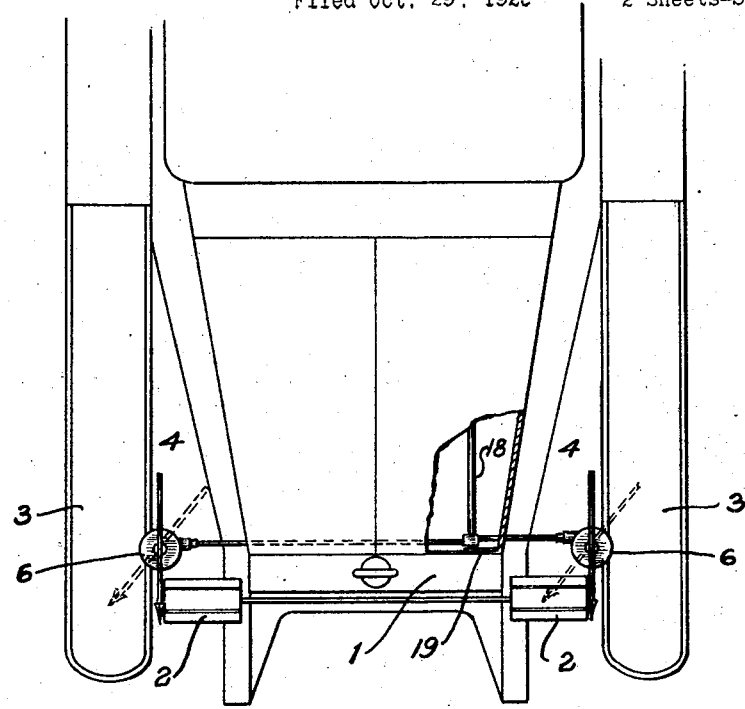
Fig. 1 is a top plan view of the forward end of an automobile showing the same equipped with my improved traffic signal.
Figure 2:
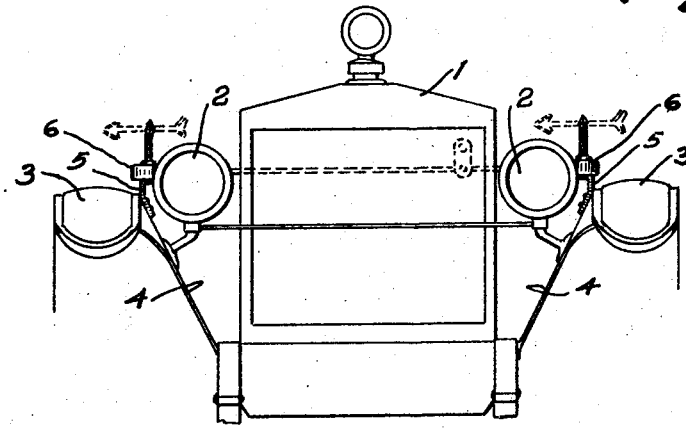
Fig. 2 is an end view of the automobile shown in Fig. 1.

The assembly 6 consists of a casing or box 7 preferably provided with a telescopic cover 8. Within the box 7 there is a member 9 provided with two spaced upwardly projecting lugs 10. The vertical shaft 11 has its lower end pivotally mounted in the socket 12 between the lugs 10. A plate 13 has a central opening through which the shaft 11 passes and is secured to the lugs by means of screws 14. A pinion 15 is non-rotatably secured to the lower end of shaft 11. The cover 8 has a central opening and can be freely moved along the shaft 11. To the top of each shaft 11 I secure an arrow 16, which may be hollow and made of translucent material, if desired, so that it may be illuminated by means of a small incandescent lamp placed within the same. A short rack 17 is slidably mounted in the box 7 and co-operates with the pinion 15 in such a manner that when the rack is moved longitudinally, the pinion and the shaft will be rotated. The rack and pinion are so related to each other that when the rack is in its central position, the arrows will stand at right angles to the axis of the rack. For the purpose of rotating the arrows about their axes, I have provided the following mechanism: A rod 18 has its front end rotatably connected to a bracket 19 that is secured in some suitable manner to the rear of the radiator. The rear end of the shaft extends to some point within convenient reach of the driver and may terminate at the instrument board or extend to a point on the steering post. The rear end of shaft 18 passes through the box in the manner shown in Figs. 4 and 5 and has secured to its extreme end a handle 21, by means of which the rod can be rotated. A pointer 22 is fastened to the shaft and can be seen through the arcuate opening 23 in box 20. Secured to the rear side of the handle 21 is a catch 24, which has a pawl 25 that is adapted to enter openings 26 in the side of the box so as to lock the shaft against rotation. A spring 26$^a$ serves to hold the catch in operative position. The driver, by grasping handle 21 and releasing the catch 24, can rotate the rod 18 in a manner obvious from the drawing. Secured to the front end of rod 18, near the bracket 19, is a crank 27, to the end of which is pivotally connected the rods 28 and 29. The other ends of rods 28 and 29 are connected to the ends of the racks 17 by means of a ball and socket joint, such as shown in Fig. 6. One end 30 of the racks 17 is reduced in diameter and threaded for the reception of a cap 31. To the end of each rod 28 and 29 I secure a ball 32, which is journaled in the cap in the manner shown in Fig. 6. From the above description, it is evident that the driver by grasping the handle 21 can rotate the rod 18 and thereby reciprocate the racks 17, which are connected to the ends of the rods 28 and 29 and thereby turn the arrows 16 to one side or the other. If it is the driver's intention to turn to the right he rotates the rod 18 in the direction that will move the arrows to the dotted line position shown in Figs. 1 and 2 and after the turn has been made, the arrows are moved back to full line position.

I have already mentioned the fact that the handle 21 can be located on the steering post if desired, or on the instrument board. It is my intention to place the handle 21 in the most convenient position.

Although the arrows have been designated more or less diagrammatically, it is my intention to make them of some material such as pyrolin, which is transparent, and to place a small incandescent lamp inside of each arrow so that they can be readily seen at night.

I am aware that the results desired can be obtained by means specifically different from those shown and described, but which operate in substantially the same way, and I do not want to be limited to the specific mechanism shown and described, but desire to make any changes in the structure that come within the scope of the appended claim.

Having now described my invention, what I claim as new is:

In an automobile signal having a signal member mounted for rotation on a vertical axis, means for rotating said member in either direction at will, said means comprising a rod mounted so as to rotate about a horizontal axis, a crank arm connected to one end of said arm, means comprising a link and a rack and pinion for connecting the crank arm to the signal member so that the latter will be rotated when the rod rotates, the other end of the rod having a handle secured thereto, said handle having means for holding it in adjusted position, and an indicator attached to the handle and movable therewith.

In testimony whereof I affix my signature.

EDWARD P. JONES.